United States Patent [19]

Tone

[11] 4,328,879
[45] May 11, 1982

[54] SHOCK-ABSORBING SPROCKET, DRIVE ASSEMBLY, AND THE LIKE

[75] Inventor: Robert P. Tone, Englewood, Colo.

[73] Assignee: The Gates Rubber Company, Denver, Colo.

[21] Appl. No.: 189,489

[22] Filed: Sep. 22, 1980

Related U.S. Application Data

[63] Continuation of Ser. No. 900,459, Apr. 27, 1978, abandoned.

[51] Int. Cl.³ .............................................. F16H 7/02
[52] U.S. Cl. ..................................... 180/219; 74/411; 474/94; 474/902; 464/74
[58] Field of Search ................. 474/152, 153, 902, 94, 474/161; 74/411, 443, 446, 447; 64/27 NM, 14; 180/219

[56] References Cited

U.S. PATENT DOCUMENTS

| 486,068 | 11/1892 | Allington | 64/27 NM |
|---|---|---|---|
| 1,181,175 | 5/1916 | Shapiro . | |
| 2,012,012 | 8/1935 | Kitzman | 64/27 NM |
| 2,873,590 | 2/1959 | Croset | 64/14 |
| 2,961,856 | 11/1960 | Seller | 64/27 |
| 3,257,860 | 6/1966 | Runde et al. | 474/94 |
| 3,964,328 | 6/1976 | Redmond, Jr. . | |

FOREIGN PATENT DOCUMENTS

| 13952 | 11/1910 | Denmark . | |
| 1500359 | 3/1969 | Fed. Rep. of Germany | 74/411 |

OTHER PUBLICATIONS

Kopper Company "Holset Resilient Couplings" Catalogue, Mar. 1973, p. 14.

*Primary Examiner*—Kenneth Dorner
*Attorney, Agent, or Firm*—Curtis H. Castleman, Jr.; Raymond Fink; H. W. Oberg, Jr.

[57] ABSTRACT

A shock-absorbing sprocket or gear assembly or like torsionally elastic device is described having resilient cushioning means interposed between mating lugs of the hub and rim to smooth and dampen torsional shocks and vibrations produced by a power drive train. An improved radial bearing surface is provided which maintains symmetry of the bearing load with respect to the drive, and which ensures concentricity between the hub and rim and keeps the rim from wobbling axially or orbiting radially with respect to the hub during operation. The cushioning means are configured relative to the hub and rim to accommodate angular displacements of at least 9°. A power transmission drive system employing the shock-absorbing sprocket of the invention is also described.

21 Claims, 9 Drawing Figures

SHOCK-ABSORBING SPROCKET, DRIVE ASSEMBLY, AND THE LIKE

This is a continuation of copending and commonly assigned application Ser. No. 900,459, filed Apr. 27, 1978 now abandoned.

BACKGROUND OF THE INVENTION

This invention relates to rotary driven members and more particularly to a sprocket or gear capable of absorbing torsional shocks and vibrations in a power drive train.

Sprocket and gear assemblies which smooth and dampen torsional shock loading and minimize noise and vibration by the use of resilient cushioning means, such as rubber cushions or springs, adapted to yieldingly transmit rotary motion between mating lugs of an integral hub and rim assembly are known. For instance, see U.S. Pat. Nos. 486,068 (Allington), 2,873,590 (Croset), 2,961,856 (Selzer), 3,257,860 (Runde et al.), and Danish Pat. No. 13952 (U.S. Class 74-243.R). See also Koppers Company "Holset Resilient Couplings" catalog, March 1973, for disclosure of other typical applications, including elastic shaft couplings. These cushioned assemblies may be used with chain, timing belt (positive drive belting), or direct gear drives, as elastic shaft couplings, or for like applications where torsional elasticity is needed. However, despite the provision of cushioning means in the assemblies, these prior art devices suffered from at least one of two problems. First, the bearing load was not symmetric with respect to the sprocket, causing the rim to either wobble axially or orbit radially with respect to the hub, and in some cases causing the hub and rim to lose concentricity under dynamic loading. Another problem derived from the nature and configuration of the resilient cushioning means, which permitted only minimal angular deflections (e.g., up to 7°) between the rim and hub portions, insufficient for drives or other applications experiencing high peak torsional shock loads.

SUMMARY OF THE INVENTION

Briefly described, in one aspect the invention pertains preferably to a shock-absorbing sprocket or other toothed power transmission assembly having a hub with a plurality of radially protruding lugs, a rim with circumferentially disposed teeth and a plurality of inwardly extending ears adapted to mate with the lugs of the hub, cushioning means interposed between the lugs and ears to transmit torque therebetween, a pair of outer flange bearings integral with and ideally having a radial dimension at least coextensive with the protruding lugs of the hub member so that the hub is sandwiched on either side thereof by the flange bearings, and a pair of ring surfaces integral with the rim and disposed axially on either side of the teeth, respectively forming radial bearing surfaces with each of the flange bearings symmetric with the load carrying member to accommodate limited, dampened rotative motion between the hub and rim portions of the sprocket assembly.

In another aspect, the invention pertains to the rim and hub assembly defined above, for toothed or non-toothed torsional dampeners, with an improved cushioning means configured to define a relatively large void volume within the captive sprocket assembly volume determined by the hub and rim surfaces, to accommodate in use large angular deflections of the hub relative to the rim (generally of at least 9°).

The relatively large void volume defined in accordance with the invention also serves to greatly increase the dampening capability of the torsionally elastic device, attributable in part to the generation of frictional forces as the cushions deflect and slide along the inner surfaces of the cavities in which the cushions are contained.

The invention also pertains to a power transmission drive including a driver sprocket, a driven sprocket, in which at least one of the two sprockets is the shock-absorbing sprocket of the invention, and a positive drive synchronous power transmission belt, e.g., timing belt, trained about the sprockets in driving relationship. The use of a polyurethane belt in a motorcycle drive in combination is particularly advantageous. The invention also pertains to a similar power transmission drive employing an endless chain, or direct gear drive between sprockets, for instance.

BRIEF DESCRIPTION OF THE DRAWINGS

The invention in its preferred embodiments will be more particularly described by reference to the accompanying drawings, in which like parts are designated by the same numerals in the various figures, and in which.

PREFERRED EMBODIMENTS OF THE INVENTION

Figure 1:
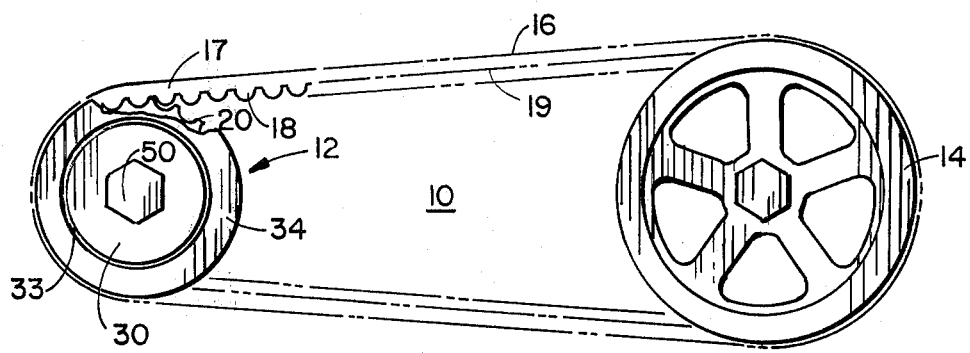
FIG. 1 is a partial cutaway view of a power transmission drive using a timing belt in accordance with the invention.

The invention will be described particularly with reference to the primary drive sprocket of a motorcycle, however the torsionally dampening device of the invention may be used in many different applications wherever torsional flexibility between the hub and rim members is required in the transmission of rotary motion. For example, the device of the invention would be useful in transmission drives of business machines, tractive drives, air conditioner compressor drives, direct gear drives and in shaft couplings. As used herein, "sprocket" is meant to include any toothed hub and rim assembly for the transmission of rotative power which may experience high torsional shocks, and is inclusive of sprockets for chain and belt drives, as well as other cog wheel or gear wheel drives.

Referring now to the drawings and particularly FIGS. 1-3, and 6 a power transmission belt drive 10 for the primary drive of a motorcycle 11 (linking engine output to transmission input) includes a shock-absorbing motion compensator drive sprocket 12 configured in accordance with the invention, a driven sprocket 14, which may be of conventional design, and a positive drive synchronous power transmission belt 16 trained about and linking sprocket 12 and sprocket 14 in driving relationship. Alternatively, the shock-absorbing compensator sprocket would offer the same advantages of noise and vibration reduction and torsional dampening if used as the driven sprocket, or as either the driver or driven sprocket in the secondary drive 13 for a motorcycle (linking transmission output to rear wheel).

The endless power transmission belt 16 is preferably formed of a polymeric body material 17, such as urethane, which has a high modulus, a tensile member 19 embedded in the body of the belt, and a plurality of teeth 18 formed on the driving surface of the belt of a predetermined pitch to make mating engagement with the corresponding teeth 20 of the compensator sprocket, and with the teeth of sprocket 14 (not shown). A preferred belt construction of high torque design, is more fully taught in U.S. Pat. No. 3,964,328 (Redmond), the disclosure of which is hereby incorporated by reference. Belts formed of other elastomeric materials, such as natural and various synthetic rubbers are also useful in the drive of the subject invention, but generally do not have nearly the torque carrying capability of polyurethane, for a given belt width.

Figure 7:
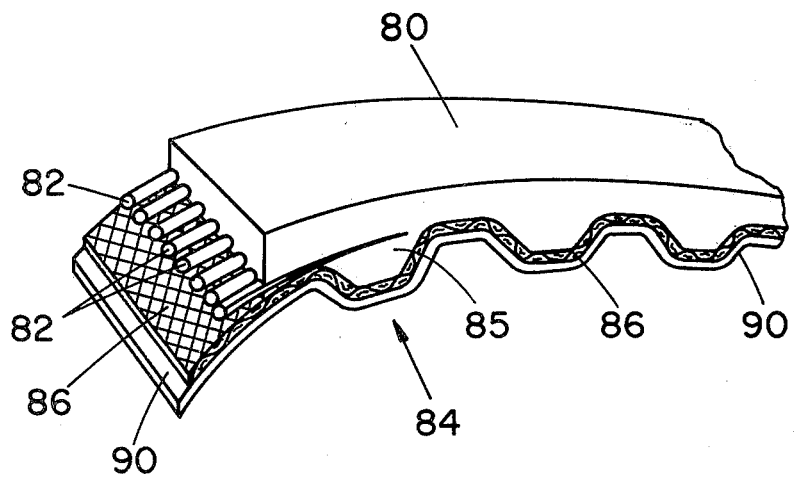
FIG. 7 is a fragmentary, perspective view of a power transmission belt useful in the drive of the invention.
Figure 8:
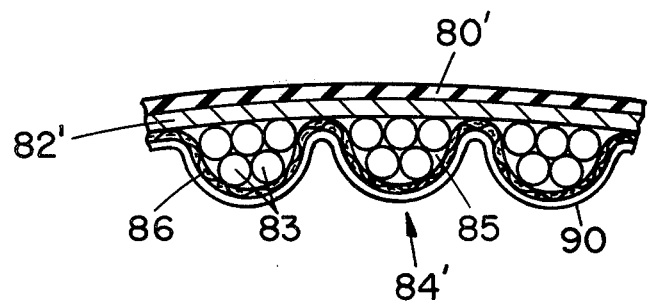
FIG. 8 is a longitudinal cross-sectional fragmentary view of a high-torque timing belt useful in the drive of the invention.
Figure 9:
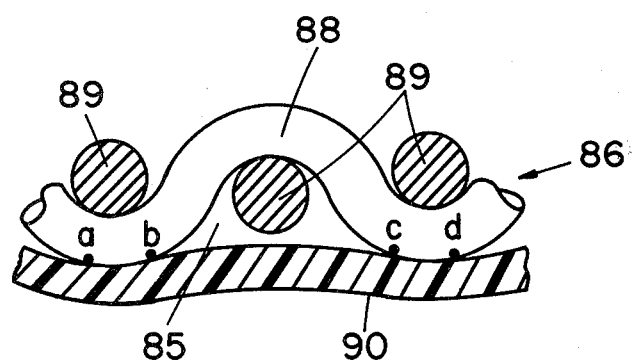
FIG. 9 is a schematic, blown up view of a bonded wear-resistant fabric layer utilized in the construction of the power transmission belt.

In accordance with a preferred belt construction under the aforementioned Redmond patent, as shown in FIGS. 7-9, the belt comprises a body portion 80,80' comprising a liquid cast elastomer material; a tensile section 82, 82' embedded within the body portion and extending longitudinally with respect to the intended direction of travel of the belt; a plurality of spaced teeth 84, 84' disposed along the inner periphery of the body portion with or without cross loading members 83 and containing said elastomeric material 85 therein; a band of wear-resistant fabric 86 comprised of fibers 88, 89 positioned along the outer surface of the teeth, the fibers 88 on the outermost, sprocket-engaging surface of the fabric band being substantially free from total encapsulation by said elastomeric material 85.

In accordance with another embodiment of a preferred belt construction under the aforementioned Redmond patent the belt comprises an elastomeric body portion 80, 80', a tensile band 82, 82' embedded in the body, and a plurality of teeth 84, 84' integral with the body and containing an elastomeric material 85 which is of the same or different material as said elastomeric body portion 80, 80' and which possesses a determined coefficient of friction, the teeth being positioned along the inner periphery sprocket-engaging surface of the belt and having a fibrous cover 86 formed over the teeth and land portions between the teeth, the improvement comprising: said fibrous cover 86 having its outer, sprocket-engaging surface substantially free of said elastomeric material of the teeth, said free outer surface of the fibrous cover exhibiting a coefficient of friction which is substantially less than the determined coefficient of friction of the elastomeric material 85 of the teeth.

As disclosed more fully in U.S. Pat. No. 3,964,328 the sprocket-engaging outer surface of the fabric layer 86 may be made free of the elastomer 85 by bonding elastomer-impervious layer 90 to the surface of the fabric with partial or full penetration prior to casting of the elastomer. This ensures that outer surfaces defined by points a-b and c-d of FIG. 9 do not become encapsulated by the elastomer upon casting. In a preferred embodiment, the layer 90 has poor abrasion resistance and wears off during running of the belt, leaving an elastomer-free, low coefficient of friction sprocket-engaging surface.

The shape of the teeth of the belt (and sprocket) is also not critical, and may be rounded as shown in FIGS. 1 and 8, truncated, or trapezoidal as in FIG. 7, for instance. While the teeth of the belt and notches 22 of the sprocket teeth must matingly engage, there is no necessity for conjugate engagement.

The shock-absorbing compensator sprocket assembly 12 of the invention is generally composed of a central hub 24, outer rim 26, resilient cushioning means 28, flange bearings 30, 32 sandwiching the hub, and a pair of rim surfaces 34, 36 integral with the rim and forming radial bearing surfaces with each of the flange bearings 30, 32.

Figure 2:
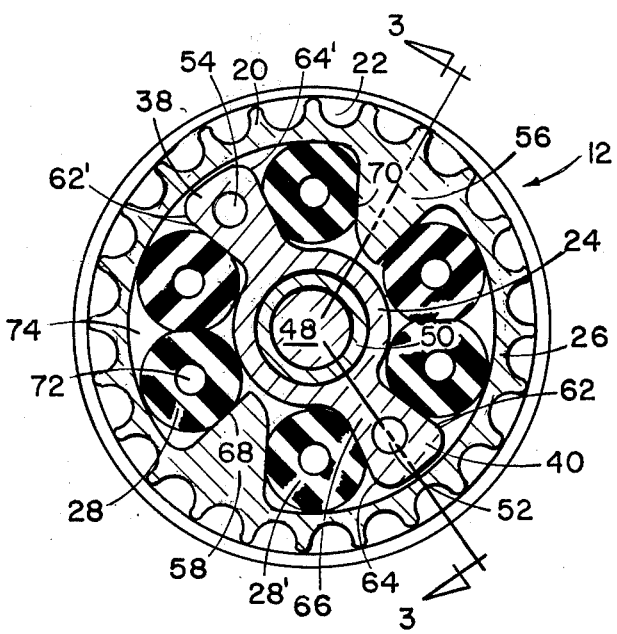
FIG. 2 is a sectional view of the left-most sprocket of FIG. 1, taken along section 2—2 of FIG. 3.

The hub 24 has at least one, preferably at least two generally radially protruding lugs 38, 40 which serve to transmit torque to the rim. Depending upon the application and size of the sprocket assembly, it may be more preferable to use at least three such lugs, to prevent any thrust-induced wobbles in the sprocket. The major diameter of the hub as measured from tip to tip of lugs 38 and 40 in FIG. 2, is somewhat less than the internal diameter of the rim to allow a clearance for rotative movement therebetween. A portion of the internal bore of the hub is splined to form a journaled fit with the splines 44 formed on the motorcycle crankshaft 42. The crankshaft, which emanates from housing 46, is threaded at its tip 48 to receive lock nut 50, which holds the sprocket in retained assembly. The lugs 38, 40 of the hub may be provided with the usual threaded bores 52, 54 to facilitate subsequent removal of the hub from the splined shaft 44.

The hub and its radially extending lugs are mounted for rotational movement within the internal cavity of rim member 26. In addition to carrying teeth 20 about its circumference (in the illustrated embodiment), the rim also has at least one, preferably a plurality of inwardly extending ears 56, 58 adapted to mate with the lugs 38, 40 of the hub, torque being transmitted from the hub member lugs to the toothed rim member through tandem rubber cylinder cushioning means 28, in the forward direction and reversing cylinder 28' in the opposite direction.

It is preferred that the forward driving surface 62 of a lug extend substantially radially, and in the case of the two-lugged hub shown, is on a common diameter with similar surface 62' of the other lug 38. The reverse driving surface 64 of the lug 40 is not on a radius, but rather is preferably substantially parallel to a radial line drawn through the center of lug 40, whereby an enlarged root 66 is defined at the juncture between the lug and inner portion 24 of the hub. This enlarged root extends the life of the hub member during repeated cycling over a wide range of variable torque and speed conditions.

The ears 56, 58 are shaped to mate properly with the lug surface under load. They are generally U-shaped (including triangular), having a first surface 68 being aligned in a substantial radial plane, and on a common diameter with the corresponding surface of the other ear 56, and positioned to form a mating relationship with the radial face 62, 62' of the lugs of the hub. In reverse rotation under load, the other leg 70 of the ears is preferably substantially parallel with the non-radial surface 64, 64' of the lugs.

It is preferred that the cushion means, which may be metal springs but more preferably elastomeric segments such as cylinders or balls are pre-compressed, as shown, to exert a biasing force against the lugs and ears of the sprocket assembly, the advantages including elimination of free play, and reducing free play due to compression set. However in some cases free play may be acceptable.

In general, the captive volume determined between the hub and rim surfaces are only partially filled with cushioning means to permit a wide range of angular deflection, and hence a larger degree of motion compensation, without adverse effect. This is especially effective to withstand high peak torsional shocks characteristic of motorcycle and other drives. Therefore, the cushioning means are configured to define a relatively large void volume (under no load) within the captive sprocket assembly volume determined between the hub and rim surfaces. Preferably, the void volume is at least about 20 percent and more preferably at least about 30 percent of this total captive volume. A cushioning means configuration highly preferred is the hollow rubber body, such as balls or the cylinders shown. The central void 72, coupled with the surrounding voids 74 allow a large angular deflection. It is preferred that the diameter of the central void 72 be at least about 25 and more preferably at least about 45 percent of the outside diameter of the cushioning means 28. Of course, the cushioning means 28 should be formed of a material compounded to have the desired modulus of elasticity, durometer and other properties to match the particular drive application.

The relatively large void volume of at least about 20 percent of the captive volume serves not only to allow the hub to undergo large angular deflections (of at least about 9°) relative to the rim member, but also has been found to greatly enhance the damping properties of the torsionally elastic device (beyond the normal hysteresis of the cushion segments). This is attributable to frictional forces generated as the cushions are deflected into the voids 74 in the captive volume and slide along the adjacent wall portions on the inner surface of the rim, outer surface of the hub, and along the inner surfaces of the flange plates 30, 32. A high degree of damping is a necessary function particularly to adequately absorb peak torques generated in various applications, e.g., in motorcycle drives, otherwise the undesirable vibrations can even be amplified in practice.

Figure 3:
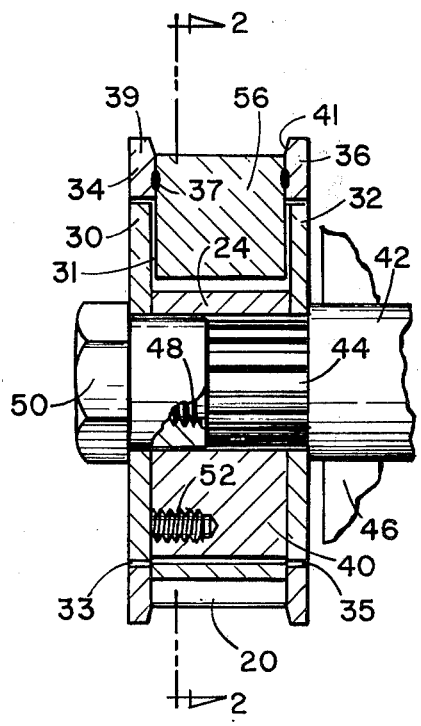
FIG. 3 is a partial sectional view of the sprocket taken along section 3—3 of FIG. 2.

The width of the hub 24 (and its protruding lugs), measured axially as in FIG. 3 is greater than the corresponding axial width of the ears 56, 58, so that in operation the ears of the rim are rotatable within the juxtaposed flange bearing members 30, 32, with side clearance 31 being provided therebetween. In practice, a side clearance of about 0.002 inches has been found acceptable. Since the ear members 56, 58 also form the thrust bearing surfaces of the sprocket, the side clearance 31 should be kept at a minimum to prevent wobbling of the assembly due to axial thrusts, misalignment of the belt or chain member, and the like.

The radial bearing surfaces are determined by annuli 33, 35, which are in turn defined by the pairs of outer flange bearings and ring surfaces 30, 34 and 32, 36, respectively. It has been found that the most important factor is to maintain the radial bearing load symmetric with respect to the belt, chain or other drive member. To this end, the radial bearing surfaces 33, 35 are positioned symmetrically in the axial direction on either side of the teeth 20, or in the case of FIG. 4 teeth 21, whereby in operation of the sprocket the radial bearing load is symmetrically distributed with respect to the power transmission member, e.g., chain, belt or gear, engaging the teeth of the sprocket. In the case of FIG. 3, the bearing surfaces are positioned immediately adjacent the margins of the teeth, whereas in FIG. 4 the radial bearing surfaces are spaced laterally and equidistant from the center plane of teeth 21.

Figure 4:
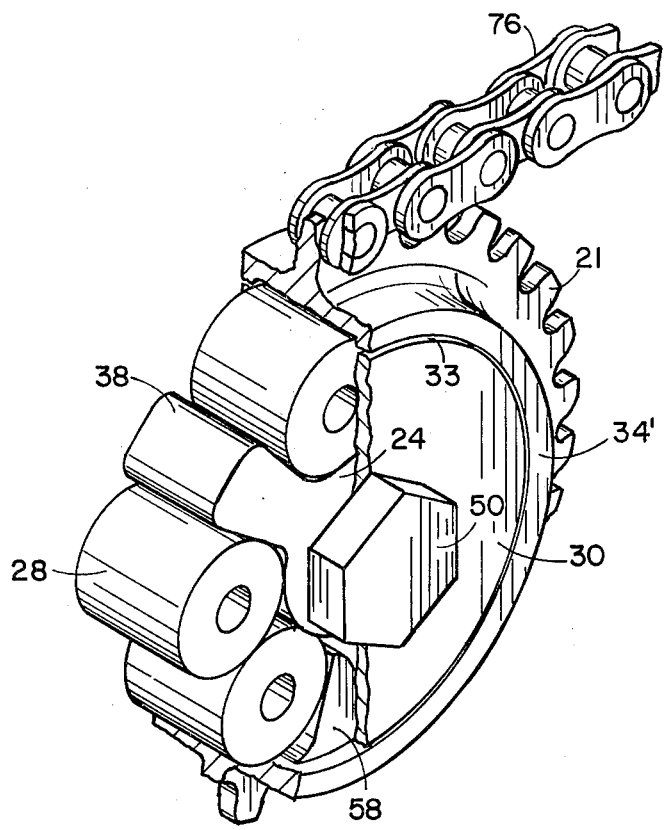
FIG. 4 is a perspective, partial cutaway of a modification of the sprocket assembly of the invention for use with chain drives; P
Figure 6:
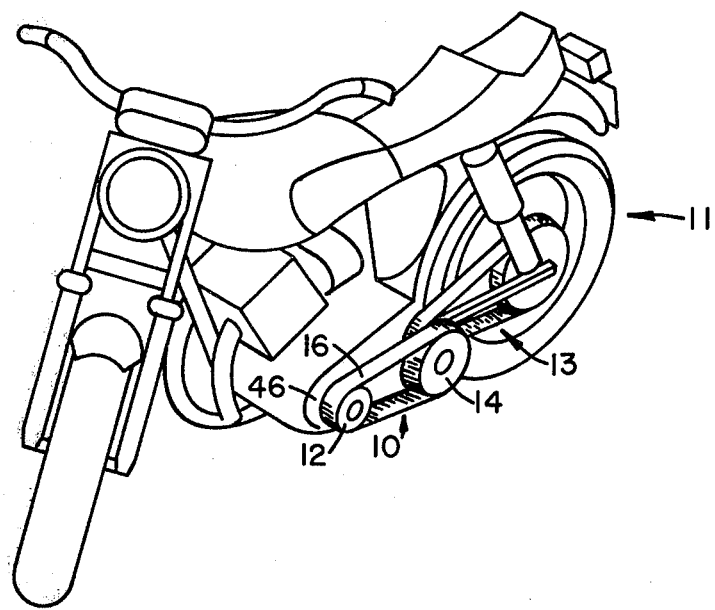
FIG. 6 is a perspective of a motorcycle employing the sprocket and drive of the invention.

In FIG. 4, roller chain 76 makes driving engagement with sprocket teeth 21 in the usual manner. In this embodiment, the outer portion of the rim 34' forms the ring surface serving as the outside diameter of the bearing annulus 33.

It is preferred that the bearing annulus surfaces 33, 35 have a radial dimension at least coextensive, and preferably greater than, the maximum cross dimension or diameter of the hub member inclusive of its protruding lugs. Having the flange bearing plates 30, 32 extend beyond the periphery of the hub has clear advantages in assembly, and in providing nearly as large a circumferential bearing surface as possible for better distribution of the radial bearing load, and to minimize torsional induced oscillations. This enlarged bearing surface also prevents the rim from wobbling axially or orbiting radially with respect to the hub, and maintains concentricity between the hub and rim.

The ring surfaces 34, 36 are integral with the rim, and in the example of FIGS. 2 and 3 are secured to the rim by brazing at 37. The ring members also include radial extensions 39, which are chamfered adjacent the teeth, to serve as flanges to retain the power transmission belt in meshing engagement with the teeth of the sprocket. The chamfered surfaces 41 compensate for slight misalignment and ensure proper entry of the belt.

While the outer flange bearing plates 30, 32 may take on various configurations, the substantially planar disks illustrated are preferred, and are either unitary with the hub member or are integral therewith by virtue of the tight frictional engagement between the parts enabled by fully tightening of nut 50 onto shaft 42. With respect to one another, the radial dimensions of bearing plates 30, 32 should preferably not vary by more than about 40 percent.

Figure 5:
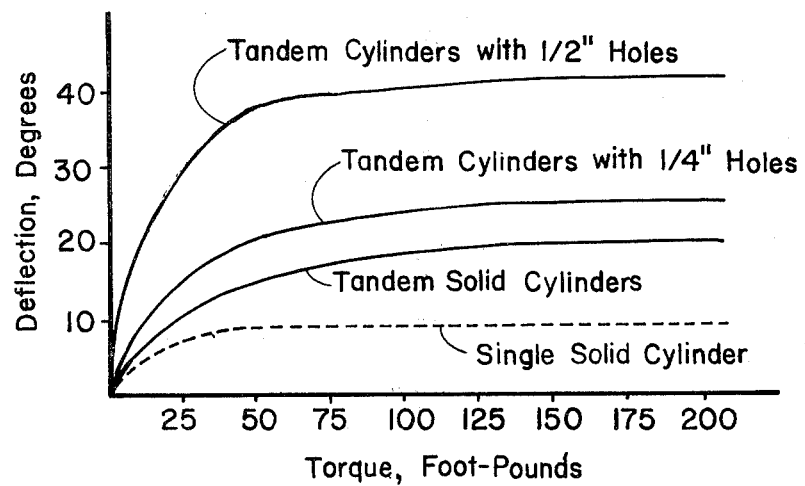
FIG. 5 is a graph of torque plotted against angular displacement of the sprocket of FIGS. 2 and 3 comparing alternative cushioning means and arrangements.

Referring now to FIG. 5, three different cylindrical cushioning means 28 were tested: (1) tandem solid cylinders; (2) tandem cylinder with a $\frac{1}{4}''$ central hole; and (3) tandem cylinder with a $\frac{1}{2}''$ central hole. All were made of the same rubber and had identical outside diameters of $\frac{7}{8}''$. As tested in the forward direction (counterclockwise sense in FIG. 2), FIG. 5 compares measured rotational deflection versus applied torque, and it can be seen that provision of void within the tandem cylinders greatly increased the deflection while maintaining the same general desired nonlinear relationship between torque and deflection as with the solid cylinder. As can be seen, the nonlinearity desirably increases dramatically with increasing central void diameter. At 200 ft-lbs. of torque, the sprocket using solid cylinders experienced a deflection of 20°, the hollow cylinder of $\frac{1}{4}''$ I.D. 24°, and the hollow cylinder of $\frac{1}{2}''$ I.D. 41°. The same test in the reverse direction resulted in a deflection of 9° for the single solid cylinder (as shown), 14° for the $\frac{1}{4}''$ I.D. hollow cylinder and 21° for the $\frac{1}{2}''$ I.D. hollow cylinder (not shown).

The sprocket of the invention possesses other advantages. The torsional elasticity and damping of the sprocket will smooth out torque peaks observed in positive drive systems. One example is the motorcycle chain or belt drive, either in the primary or secondary drive system. The sprocket of the invention smooths torque pulses generated by the engine at low engine speeds, and provides a jerk-free ride.

The particular construction of shock-absorbing sprocket described above results in a torsionally elastic-damped sprocket with initially virtually zero backlash, even during torque reversals. If backlash develops upon continued use, acceptable performance still exists. An additional advantage lies in the compactness of the sprocket, its light weight, and relatively few parts required. The sprocket requires no more space than a standard rigid sprocket for positive drive belt applications.

Another advantage lies in the fact that the bearing surface is on the outside diameter of the bearing annulus, so that lubricant is forced into the bearing surface by centrifugal force. Excess grease or other lubicant will therefore migrate toward the bearing surface.

The invention is capable of a variety of variations and modifications as will become apparent from a reading of the specification. It is intended that the invention be limited only by the terms of the claims appended hereto together with equivalent structures.

What is claimed is:

1. In combination with a motorcycle, a motorcycle primary and/or secondary power transmission drive, including a driver sprocket, a driven sprocket, and a positive drive synchronous power transmission belt linking the sprockets in driving relationship and having teeth of desired pitch spaced along the inward driving surfaces of the belt meshing with mating teeth of the sprockets, wherein at least one of the sprockets is a torsionally shock-absorbing power transmission assembly having a hub with at least one radially protruding lug, a rim with circumferentially disposed teeth and at least one inwardly extending ear adapted to mate with the lug of the hub, outer flange bearings attached to and sandwiching the hub on either side thereof, ring surfaces attached to the rim and disposed axially on either side of the sprocket teeth respectively forming radial bearing surfaces with each of the flange bearings, and elastomeric cushion means interposed between the lug and ear to transmit torque therebetween, the cushion means being so configured relative to the shock-absorbing power transmission assembly to define a void volume of at least about 20 percent of the captive sprocket assembly volume determined by the hub, and rim surfaces and other portions of the shock-absorbing power transmission assembly, to accommodate in use angular deflections of at least 9 degrees of the hub relative to the rim.

2. The combination of claim 1 wherein said void volume is at least 20 percent and said angular deflections are at least 14 degrees at 200 ft.-lbs. torque.

3. A motorcycle primary or secondary power transmission comprising a driver sprocket, a driven sprocket and a synchronous polyurethane power transmission belt linking the sprockets in driving relationship and having teeth of desired pitch spaced along the inward driving surfaces of the belt meshing with mating teeth of the sprockets, wherein at least one of the sprockets is a torsionally shock-absorbing power transmission assembly having a hub with a plurality of radially protruding lugs, a rim with circumferentially disposed teeth and a plurality of inwardly extending ears adapted to mate with the lugs of the hub, outer flange bearings attached to and sandwiching the hub on either side thereof, ring surfaces attached to the rim and disposed axially on either side of the sprocket teeth respectively forming radial bearing surfaces with each of the flange bearings, and elastomeric cushion means interposed between the lugs and ears to transmit torque therebetween, the cushion means being so configured relative to the shock-absorbing power transmission assembly to define a relatively large void volume with the captive sprocket assembly volume determined by the hub, and rim surfaces and other portions of the shock-absorbing power transmission assembly, to accommodate in use angular deflections of at least 9 degrees of the hub relative to the rim.

4. The drive of claim 3 wherein the belt comprises:
   a body portion comprising a liquid cast elastomer material;
   a tensile section embedded within the body portion and extending longitudinally with respect to the intended direction of travel of the belt;
   said spaced belt teeth being disposed along the inner periphery of the body portion and containing said elastomeric material therein; and
   a band of wear-resistant fabric comprised of fibers positioned along the outer surface of the teeth, the fibers on the outermost, sprocket-engaging surface of the fabric band being substantially free from total encapsulation of said elastomeric material.

5. The drive of claim 3 herein the belt comprises: an elastomeric body portion, a tensile band embedded in the body, said belt teeth being integral with the body and containing an elastomeric material which is of the same or different material as said elastomeric body portion and which possesses a determined coefficient of friction, the belt teeth being positioned along the inner periphery sprocket-engaging surface of the belt and having a fibrous cover formed over the teeth and land portions between the teeth, the improvement comprising: said fibrous cover having its outer sprocket-engaging surface substantially free of said elastomeric material of the teeth, said free outer surface of the fibrous cover exhibiting a coefficient of friction which is substantially less than the determined coefficient of friction of the elastomeric material of the teeth.

6. A torsional vibration absorbing power transmission drive adapted to smooth and dampen torque pulses generated by an engine operable at low engine speeds, to which the vibration absorbing drive is connected, comprising a rotary driver member, a rotary driven member, an endless power transmission member trained about the rotary members in driving relationship, at least one of the rotary members being shock-absorbing and having a hub member having at least two lugs, an outer rim member having at least two radially inwardly extending ears adapted to matingly engage the lugs through torque-transmitting resilient elastomeric cushions interposed therebetween, characterized in that the shock-absorbing rotary member has outer flange bearings attached to and sandwiching the hub on either side thereof, and ring surfaces attached to the rim and disposed axially on either side thereof respectively forming radial bearing surfaces with each of the flange bearings, and the cushions occupy a portion of captive volumes defined within the shock-absorbing rotary member (under no load), the portion of the captive volume unoccupied by a cushion material defining void volume which is at least about 20 percent of the total captive volume, whereby upon rotation of the hub relative to the rim member, in addition to the inherent hysteresis of the elastomeric cushion members the damping properties of the vibration absorbing device are enhanced by frictional forces generated as the cushions are deflected into the unoccupied volume of the captive volumes and slide along wall portions of such captive volumes.

7. The power transmission drive of claim 6 wherein the endless power transmission member is a power transmission belt.

8. The power transmission drive of claim 7 wherein the power transmission belt is a synchronous belt.

9. The vibration absorbing drive of claim 6 wherein the void volume is at least about 30 percent and the angular deflection of the hub relative to the rim is at least about 14 degrees at 200 ft.-lbs. torque.

10. In a shock-absorbing power transmission sprocket assembly, adapted to be used with a positive drive power transmission belt, the sprocket assembly having a hub with at least one radially protruding lug, the lug including a marginal end thereof, a rim with circumferentially disposed teeth and at least one inwardly extending ear adapted to mate with the lug of the hub, and cushioning means interposed between the lug and ear to transmit torque therebetween, the improvement comprising:
  a pair of outer flange bearings integral with and having a radial dimension at least coextensive with the marginal end of the protruding lug of the hub member, sandwiching the hub on either side thereof;
  a pair of ring surfaces integral with the rim and disposed axially on either side thereof, respectively forming radial bearing surfaces with each of the flange bearings to accommodate limited, smoothed and dampened rotative motion between the hub and rim portions of the assembly;
  said ring surfaces having radial extensions which serve as flanges to retain the power transmission belt in meshing engagement with the teeth of the sprocket; and
  said cushioning means comprising elastomeric bodies so configured relative to the adjoining rim, flange bearings and hub to define a void volume of at least about 20 percent of the total captive volume defined between the hub, flange bearings and rim surfaces under no load condition, to accommodate in use a large angular deflection of the hub relative to the rim.

11. A power transmission drive comprising a driver sprocket, a driven sprocket, and a positive drive synchronous power transmission belt linking the sprockets in driving relationship and having teeth of desired pitch spaced along the inward driving surfaces of the belt meshing with mating teeth of the sprockets, at least one of the sprockets being a shock-absorbing sprocket assembly having a hub with at least one radially protruding lug, the lug including a marginal end thereof; a rim with at least one inwardly extending ear adapted to mate with the lug of the hub; cushioning means interposed between the lug and ear to transmit torque therebetween; a pair of outer flange bearings integral with and having a radial dimension at least coextensive with the marginal end of the protruding lug of the hub member, sandwiching the hub on either side thereof; a pair of ring surfaces integral with the rim disposed axially on either side thereof, respectively forming radial bearing surfaces with each of the flange bearings to accommodate limited, smoothed and dampened rotative motion between the hub and rim portions of the assembly, the rim carrying circumferentially disposed teeth positioned between the pair of ring surfaces; and said cushioning means comprising elastomeric bodies so configured relative to the adjoining rim, flange bearings and hub to define a void volume of at least about 20 percent of the total captive volume defined between the hub, flange bearings and rim surfaces under no load condition, to accommodate in use a large angular deflection of the hub relative to the rim.

12. A power transmission drive comprising a driver sprocket, a driven sprocket, a positive drive synchronous power transmission belt linking the sprockets in driving relationship and having teeth of desired pitch spaced along the inward driving surfaces of the belt meshing with mating teeth of the sprockets, at least one of the sprockets being a vibration resistant torsionally elastic sprocket assembly having a hub with at least two lugs protruding radially therefrom; a rim with circumferentially disposed teeth and at least two inwardly extending ears adapted to matingly engage the lugs of the hub; resilient cushioning means interposed between the lugs and ears to transmit torque therebetween; outer flange bearings integral with and sandwiching the hub on either side thereof; ring surfaces integral with the rim and disposed axially on either side of the teeth, respectively forming radial bearing surfaces with each of the flange bearings to accommodate limited, smoothed and dampened rotative motion between the hub and rim portions of the sprocket assembly; said radial bearing surfaces being positioned symmetrically in the axial direction of either side of the teeth; and said cushioning means comprising elastomeric bodies so configured relative to the adjoining rim, flange bearings and hub to define a void volume of at least about 20 percent of the total captive volume defined between the hub, flange bearings and rim surfaces under no load condition, to accommodate in use an angular deflection of at least 9° of the hub relative to the rim.

13. A power transmission drive comprising a driver sprocket, a driven sprocket, and an endless chain linking the sprockets in driving relationship, at least one of the sprockets being a shock-absorbing sprocket assembly having a hub with at least one radially protruding lug, the lug including a marginal end thereof; a rim with at least one inwardly extending ear adapted to mate with the lug of the hub; cushioning means interposed between the lug and ear to transmit torque therebetween; a pair of outer flange bearings integral with and having a radial dimension at least coextensive with the marginal end of the protruding lug of the hub member, sandwiching the hub on either side thereof; a pair of ring surfaces integral with the rim disposed axially on either side thereof, respectively forming radial bearing surfaces with each of the flange bearings to accommodate limited, smoothed and dampened rotative motion between the hub and rim portions of the assembly, the rim carrying circumferentially disposed teeth meshing with the chain and positioned between the pair of ring surfaces; and said cushioning means comprising elastomeric bodies so configured relative to the adjoining rim, flange bearings and hub to define a void volume of at least about 20 percent of the total captive volume defined between the hub, flange bearings and rim surfaces under no load condition, to accommodate in use a large angular deflection of the hub relative to the rim.

14. A power transmission drive comprising a driver sprocket, a driven sprocket, and an endless chain linking the sprockets in driving relationship, at least one of the sprockets being a vibration resistant torsionally elastic sprocket assembly having a hub with at least two lugs protruding radially therefrom; a rim with circumferentially disposed teeth meshing with the chain and at least two inwardly extending ears adapted to matingly engage the lugs of the hub; resilient cushioning means interposed between the lugs and ears to transmit torque therebetween; outer flange bearings integral with and sandwiching the hub on either side thereof; ring surfaces integral with the rim and disposed axially on either side of the teeth, respectively forming radial bearing surfaces with each of the flange bearings to accommodate limited, smoothed and dampened rotative motion between the hub and rim portions of the sprocket assembly; said radial bearing surfaces being positioned symmetrically in the axial direction of either side of the teeth; and said cushioning means comprising elastomeric bodies so configured relative to the adjoining rim, flange bearings and hub to define a void volume of at least about 20 percent of the total captive volume defined between the hub, flange bearings and rim surfaces under no load condition, to accommodate in use an angular deflection of at least 9° of the hub relative to the rim.

15. A power transmission drive comprising a rotary driver member, a rotary driven member, an endless power transmission member linking the rotary members in driving relationship, at least one of the rotary members being a shock-absorbing power transmission assembly having a hub with at least one radially protruding lug; a rim with at least one inwardly extending ear adapted to mate with the lug of the hub; cushioning means interposed between the lug and ear to transmit torque therebetween; a pair of outer flange bearings integral with and sandwiching the hub on either side thereof; a pair of ring surfaces integral with the rim and disposed axially on either side thereof, respectively forming radial bearing surfaces with each of the flange bearings; and said cushioning means comprising elastomeric bodies so configured relative to the adjoining rim, flange bearings and hug to define a relatively large void volume under no load condition, to accommodate in use a relatively large angular deflection of the hub relative to the rim.

16. The power transmission drive of claim 15 wherein the endless power transmission member is a power transmission belt.

17. The power transmission drive of claim 16 wherein the power transmission belt is a synchronous power transmission belt.

18. The power transmission drive of claim 16 wherein the ring surfaces have radial extensions which serve as flanges to retain the power transmission belt during operation of the drive.

19. The power transmission drive of claim 15 wherein said void volume is at least 20 percent and wherein the angular deflection of the hub relative to the rim is at least 14° at 200 ft.-lbs. torque.

20. The power transmission drive of claim 15 wherein the radial bearing surfaces are positioned symmetrically in the axial direction on either side of the teeth, whereby in operation of the assembly the bearing load is symmetrically distributed with respect to the endless power transmission member, such as a chain or belt engaging the teeth of the assembly.

21. The power transmission drive of claim 15 wherein the flange bearings are in the form of disks having an outer diameter greater than the outside diameter of the hub together with the lugs protruding thereform.

* * * * *